(12) United States Patent
Klapproth et al.

(10) Patent No.: US 8,364,860 B2
(45) Date of Patent: Jan. 29, 2013

(54) DATA-PROCESSING SYSTEM AND DATA-PROCESSING METHOD

(75) Inventors: Peter Klapproth, Waalre (NL); Greg Ehmann, Sleepy Hollow, IL (US); Claus Pfeiffer, Eckental (DE)

(73) Assignee: NXP B.V., Eindhoven (NL)

( * ) Notice: Subject to any disclaimer, the term of this patent is extended or adjusted under 35 U.S.C. 154(b) by 196 days.

(21) Appl. No.: 12/678,757

(22) PCT Filed: Sep. 18, 2008

(86) PCT No.: PCT/IB2008/053802
§ 371 (c)(1),
(2), (4) Date: Mar. 18, 2010

(87) PCT Pub. No.: WO2009/040708
PCT Pub. Date: Apr. 2, 2009

(65) Prior Publication Data
US 2010/0211702 A1    Aug. 19, 2010

Related U.S. Application Data

(60) Provisional application No. 60/975,757, filed on Sep. 27, 2007.

(51) Int. Cl.
*G06F 3/00* (2006.01)
(52) U.S. Cl. ......................................................... 710/18
(58) Field of Classification Search .................. 710/18
See application file for complete search history.

(56) References Cited

U.S. PATENT DOCUMENTS

| | | | | |
|---|---|---|---|---|
| 6,330,225 B1 * | 12/2001 | Weber et al. | ............. | 370/231 |
| 7,437,217 B2 * | 10/2008 | Lehr et al. | ............. | 700/297 |
| 2005/0055592 A1 | 3/2005 | Velasco et al. | | |
| 2005/0216607 A1 | 9/2005 | Munguia | | |
| 2005/0216643 A1 | 9/2005 | Munguia | | |
| 2007/0101168 A1 | 5/2007 | Atkinson | | |
| 2008/0077811 A1 * | 3/2008 | Dove | ............. | 713/300 |

OTHER PUBLICATIONS

Worm, et al; "An Adaptive Low-Power Transmission Scheme for On-Chip Networks," ISSS'02; Kyoto, Japan; pp. 92-100 (Oct. 2002).
Meijer, et al, "Technology Exploration for Adaptive Power and Frequency Scaling in 90nm CMOS," Proceedings of the 2004 Intl Symposium on Low Power Electronics and Design, pp. 14-19 (2004).
Alexandru, et al, "Simultaneous Communication and Processor Voltage Scaling for Dynamic and Leakage Energy Reduction in Time-Constrained Systems," IEEE/ACM International Conference on Computer Aided Design 2004, pp. 362-369 (Nov. 2004).
Shang, et al, "Dynamic Voltage Scaling With Links for Power Optimization of Interconnection Networks," High Performance Computer Architecture, IEEE, 12 Pgs (2003).
International Search Report for Int'l Appln. No. PCT/IB2008/053802, May 15, 2009, Publ'd as WO 2009/040708A3.

* cited by examiner

*Primary Examiner* — Henry Tsai
*Assistant Examiner* — Juanito Borromeo (57) ABSTRACT

A data-processing system is described comprising: • A plurality of data-processing devices (11, 12, 13, 14) • A data-handling facility (20) shared by the data-processing devices, • An aggregation facility (30) for receiving signals (R1, R2, R3, R4) indicative for individual requirements from the data-processing devices for a performance of the shared data-handling facility and for providing a control signal (RA) indicative for a required activity level to meet the aggregated requirements, • a control device (40) for controlling an activity level of the data-handling facility depending on the control signal (RA). Additionally a data-processing method is described.

10 Claims, 10 Drawing Sheets

DATA-PROCESSING SYSTEM AND DATA-PROCESSING METHOD

FIELD OF THE INVENTION

The present invention relates to a data-processing system. The present invention further relates to a data-processing method.

BACKGROUND OF THE INVENTION

Dynamic voltage and/or frequency scaling has been widely proposed to adapt the power consumption of processors to the minimum required level necessary to achieve a required performance. This is in particular important in mobile devices, such as in mobile phones, laptops and pda's, operating on battery power. The performance delivered by such mobile devices not only depends on the performance of the processors used therein, e.g. digital signal processors, general purpose processors etc, but also on the performance of data-handling facilities used by such processors, such as memories and communication networks. Important performance parameters for such data-handling facilities are a bandwidth, i.e. a number of data-units handled per time-unit and a latency, the delay between the request for a handling of data and the time within which the request is performed. In the sequel, a request will also be denoted as command, and all events required to complete a single command will also be denoted as transaction.

Worm et al., "An Adaptive Low-power Transmission Scheme for On-chip Networks", ISSS'02, Oct. 2-4, 2002, Kyoto, Japan, describe a point-to-point unidirectional on-chip interconnect. Data is transmitted in encoded form via this interconnect and decoded by a receiver. If transmitted encoded data has an irrecoverable error, a retransmission takes place. The retransmissions of transmitted encoded data are repeated until the decoding by the receiver is successful. In this interconnect, the error rate is controlled by the swing voltage with which the transmitter drives the interconnect. A higher swing voltage results in a lower error rate. As a consequence the average number of retransmissions is reduced and therewith the average bandwidth is increased.

The cited article merely provides a solution to regulate power consumption in a network of a system comprising point-to-point links.

SUMMARY OF THE INVENTION

Among others, it is an object to enable a regulation of power in a data-handling facility being shared by more than one pair of a transmitter and a receiver.

According to one aspect a data-processing system comprises:

A plurality of data-processing devices,

A data-handling facility shared by the data-processing devices,

An aggregation facility for receiving signals indicative for individual requirements from the data-processing devices for a performance of the shared data-handling facility and for providing a control signal indicative for a required activity level to meet the aggregated requirements, a control device for controlling an activity level of the data-handling facility depending on the control signal.

This has the advantage that the power consumption by a shared data-handling facility can be reduced to a lower level provided that it is sufficient to fulfill the requirements of the plurality of master data-processing devices and eventually one or more slave data-processing devices. Contrary to what is known the power consumption of the shared data-handling facility is not adapted to an individual requirement e.g. a processing speed of a processor or a bandwidth of a point-to-point communication link, but a to a set of devices that share the data-handling facility. The individual requirements from the data-processing devices may be aggregated in different ways, depending on the type of performance that is required.

In an embodiment the data-processing devices may for example give a general indication of their own activity level, for example expressed as a fraction of their maximum activity. In that case the aggregated performance requirement is for example a fraction of the maximum performance of the data-handling facility, wherein said fraction of the maximum performance is a function of the individual fractions. For example, the function is the sum of the individual fractions divided by the number data-processing devices contributing to said sum. The contributions may be weighted. This embodiment has the advantage that it allows a relatively simple power control at run-time. Nevertheless the indications for the activity levels of the data-processing devices should be carefully characterized.

In an embodiment the required type of performance is an average or a minimum bandwidth. In that case the aggregated performance requirement is preferably the sum of the individually required bandwidths.

In another embodiment the required type of performance is an average or a maximum latency, in which case the aggregated performance requirement is preferably a minimum of the individually required latencies.

The latter two embodiments allow a more easy characterization of the requirements towards the shared data-handling facility, because in these embodiments the requirements considered are more specific.

In again another embodiment the required type of performance is an error rate, in which case the aggregated performance requirement is preferably a minimum of the individually required error rates.

In an embodiment the shared data-handling facility comprises a data-storage device, e.g. a cache memory or a main memory. Data stored in the data-storage device by a data-processing device may be re-used by the same data-processing device, but may alternatively be read by an other data-processing device, so that the storage device functions as, part of, a data-communication facility In another embodiment the data-handling facility comprises a data-communication facility in the form of a bus or a network.

In an embodiment the data-processing facility comprises at least one monitor for monitoring an available performance of the data-handling facility towards a data-processing device and for comparing the available performance with the required performance, and wherein a difference between the available and the required performance is used to control the activity level of the data-handling facility. By monitoring the actually available performance offered by the data-handling facility to the individual data-processing devices the requirements of the data-processing devices can be more accurately met. Moreover, this embodiment allows the data processing devices to have mutually different types of requirements. For example if either of the monitors indicates that the requirement(s) of its data-processing devices is/are not met it will indicate to the aggregation facility that it requires an increased performance. As long as the aggregation facility receives one or more requests for improval of performance, regardless whether it is for latency or bandwidth for example, it will request the control unit to control the shared data-handling facility towards a higher activity level until all requirements are met. Alternatively the improval requests of the monitors may be weighted.

In an embodiment the data processing facility comprises at least one monitor for monitoring an available performance of the data-handling facility towards at least one data-processing device, the monitor comprising hardware facilities for recording at least one parameter selected from a maximum latency, a total latency, a total number of data units handled, and a general processing unit for reading said at least one parameter and calculating an aggregated performance from the at least one selected parameter. This embodiment has the advantage that on the one hand monitoring can be performed with a relatively low hardware requirements, as the parameters from which the at least one parameter is selected can be determined with relative simple hardware, such as adders and comparators. The more complicated calculations, such as divisions can be carried out by the general processing unit, which can be used also for other purposes. On the other hand this embodiment causes little overhead in communication as it suffices that the general processing unit only communicates with the hardware facilities at the start and the end of a monitoring time-frame.

In a practical embodiment the data processing facility comprises a latency logic unit with a time-stamp unit for providing a point in time indication. A FIFO-memory has an input coupled to said time-stamp unit for storing a point in time indication of a data handling request from a monitored data processing facility. A subtractor coupled to the time-stamp unit and an output of the FIFO-memory subtracts a point in time indication of a data handling request from a point in time indication of an execution of the request by the shared data handling facility. In this way for each transaction a latency is determined. The difference so obtained may be accumulated to obtain a value for the total latency, and/or a maximum latency may be obtained therefrom.

Such embodiment of the data processing facility may further comprise a latency tracking logic unit with a state machine and a plurality of counters, wherein the latency logic unit monitors a latency parameter for a selected processing device, and the counters count a number of data transactions for data processing devices not being monitored, wherein the state machine upon a request for monitoring for a different processing device prevents the FIFO from accepting further input from the time-stamp unit and flushes the FIFO stepwise upon execution of each request for which the point in time indication was stored in the FIFO and wherein the state machine allows the FIFO to accept point in time indications for the different processing device after the FIFO is flushed. This makes it possible to use a single monitor to subsequently observe the latency in the response of the shared data handling device towards different data processing devices.

BRIEF DESCRIPTION OF THE DRAWINGS

These and other aspects are described in more detail with reference to the drawing. Therein

DETAILED DESCRIPTION OF EMBODIMENTS

Figure 1:
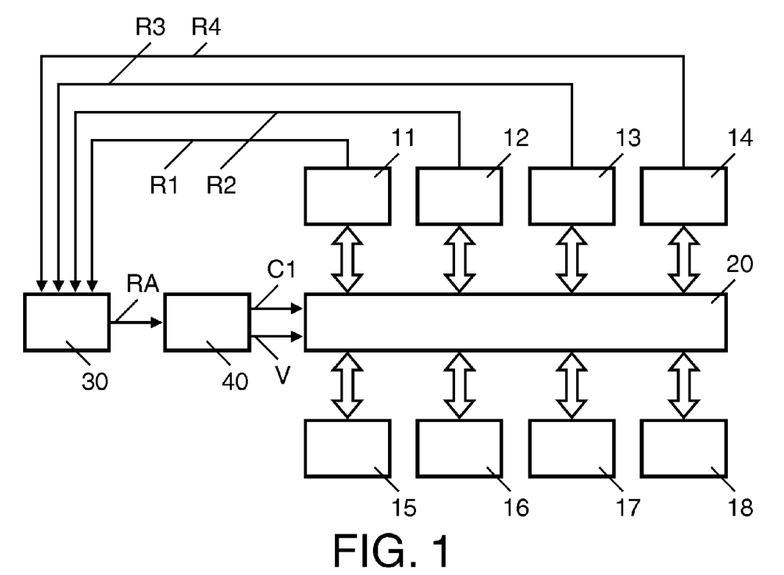
FIG. 1 shows a first embodiment of a data processing system according to the invention.

FIG. 1 shows a data processing system comprising a plurality of data-processing devices 11, 12, 13, 14. The data processing devices share a data-handling facility 20, such as a network for communication or a (cache) memory. The data processing devices 11, 12, 13, 14 provide respective signals R1, R2, R3, R4, indicative for their requirements to the performance delivered to them by the shared data-handling facility 20. With the signals R1, R2, R3, R4, the data processing devices 11, 12, 13, 14 may for example indicate their own level of activity, for example as a percentage of their maximum level of activity. An aggregation facility 30 receives these signals R1, R2, R3, R4, and provides a control signal RA indicative for a required activity level of the data-handling facility 20 to meet the aggregated requirements. The term signal in this context is understood to be any means in which the data processing devices communicate their requirement indication to the aggregation facility 30, e.g. a 'hardware' signal, such as a voltage applied on a signal line, or a software signal, e.g. a value exchanged in a register or memory location.

A control device 40 is provided for controlling the activity level of the data-handling facility 20 depending on the control signal RA. If the data-handling facility is a synchronously operating device it may for example control the activity level by setting a clock speed CI. If a relatively low activity level is sufficient to meet the aggregated requirements of the data processing devices 11, 12, 13, 14 then the clock speed can be set to a relatively low level, which results in a reduced power consumption. Although a reduction in the clock speed alone already results in a reduction of power consumption, the control device 40 may additionally reduce a supply voltage V to a minimum level sufficient to allow the shared data-handling device 20 to operate at the clock speed CI set by the control device. A method for simultaneous control of supply voltage and clock speed is for example described by Meijer et al. in "Technology Exploration for Adaptive Power and Frequency Scaling in 90 nm CMOS", in Proceedings of the 2004 international symposium on Low power electronics and design, Newport Beach, Calif., USA, pp. 14-19, 2004, ISBN: 1-58113-929-2.

If the shared data-handling device 20 is an asynchronously operating device, the control device 40 may control solely the supply voltage V to the minimum level required to meet the aggregated requirements of the data processing devices 11, 12, 13, 14.

In addition the data processing system may comprise one or more other data processing devices 15, 16, 17, 18 that have no influence on the activity level of the data-handling device. For example these data processing devices have a constant requirement of performance of the shared data-handling facility, so that it is not necessary to signal this requirement. Alternatively these other data processing devices may have a requirement that can easily be derived from the requirements of the data 11, 12, 13, 14.

In an embodiment, where the signals R1, R2, R3, R4 of the processing devices 11-14 are indicative for the required minimum of the bandwidth delivered by the shared data-handling device 20 to each the processing devices, the aggregation facility 30 may calculate a control signal RA indicative for a required activity level of the data-handling to provide a total bandwidth equal to the sum of the bandwidths to be delivered to the individual processing devices.

In an embodiment, where the signals R1, R2, R3, R4 of the processing devices 11-14 are indicative for the required maximum to the latency with which the shared data-handling device responds to each of the processing devices, the aggregation facility 30 may calculate a control signal RA indicative for a required activity level of the data-handling to respond with a maximum latency equal to the minimum of the latency requirements of the individual processing devices.

Figure 2:
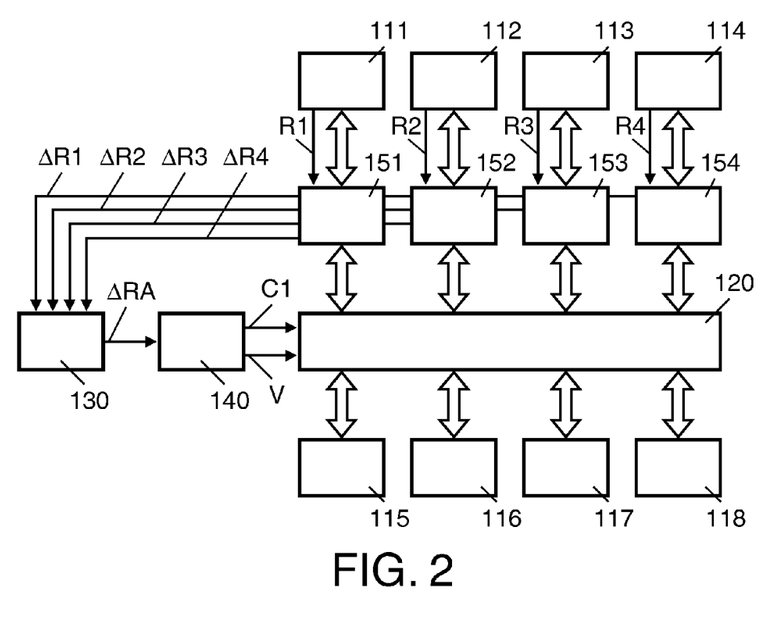
FIG. 2 shows a second embodiment of a data processing system according to the invention.

FIG. 2 shows a second embodiment of a data-processing facility according to the invention. Part therein corresponding to those in FIG. 1 have a reference number that is 100 higher. In this embodiment the data-processing facility comprises at least one monitor 151. The monitor 151-154 monitors an available performance of the data-handling facility 120 towards the data-processing device 111-114 to which it is coupled, and compares the available performance with the required performance R1. The monitors 151 calculate a difference ΔR1, ΔR2, ΔR3, ΔR4 between the available and the required performance, which is used to control the activity level of the data-handling facility 120. In the embodiment shown each of the data-processing facilities 111-114 has a respective monitor 151-154. The monitors 151-154 each provide a signal indicative for the difference ΔR1, ΔR2, ΔR3 and ΔR4 between the performance available to and the performance R1-R4 required by their processing device.

The signal indicative for the difference (difference signal) may be provided in different ways. In an embodiment the difference signal is a binary signal, which indicates whether the performance should be improved or may be reduced. Alternatively a ternary difference signal may be used indicating a request for improval, a maintenance or a reduction of the delivered performance. The possibility to indicate a maintenance of delivered performance makes it easier to realize a stable control, although also in the binary case the aggregation facility 130 may decide to stabilize the activity level of the shared data-handling facility 120 if equal numbers of processing devices require an improvement and a reduction respectively.

Alternatively a multilevel difference signal may be used, which additionally indicates a degree of requested improval or reduction. Likewise this facilitates a stable control.

Figure 2A:
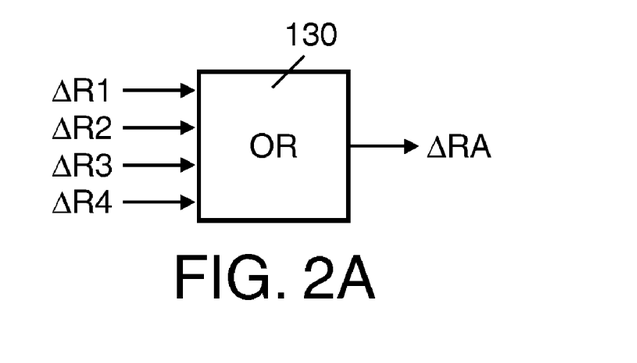
FIGS. 2A, 2B, 2C show examples of aggregation facilities of in a data processing system according to the second embodiment.

FIG. 2A shows a first example of the aggregation facility 130, where the difference signals are binary signals. A logical 0 and a logical 1 respectively are indicative for a request for reduction and a request for improval of the performance offered. In this example the aggregation facility 130 is an OR-gate. If at least one of the difference signals indicates a request for improval, the aggregated difference control signal indicates that improval of the performance is required and consequently has the control device 40 increase the activity level of the shared data-handling facility 120.

Figure 2B:
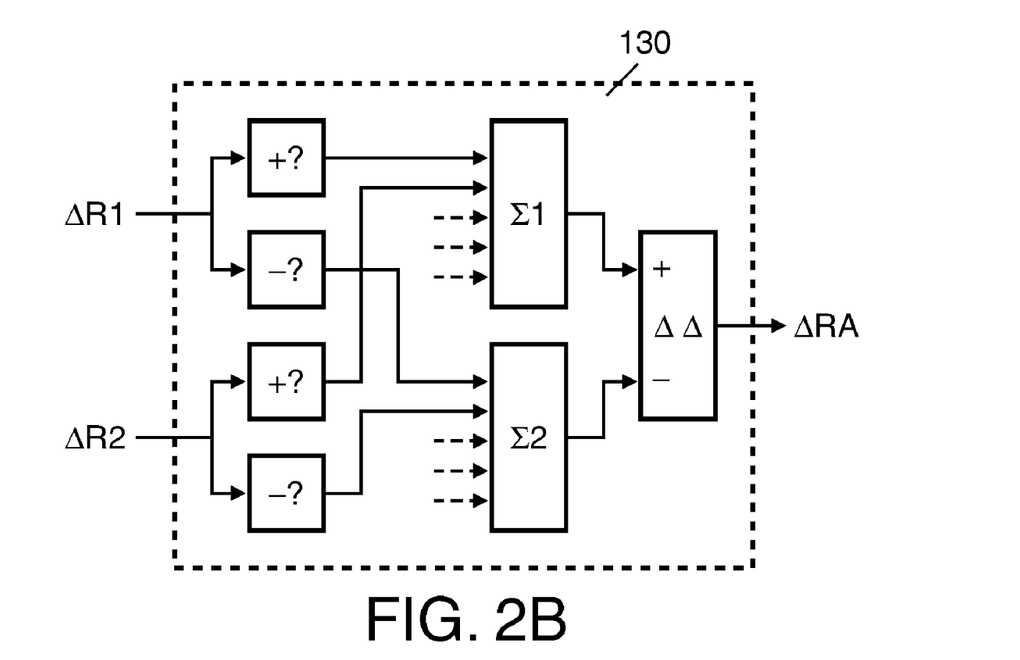

FIG. 2B shows a second example, wherein the aggregation facility comprises a first and a second set of comparators. The first set of comparators, indicated by the symbol "+?" determine whether an improval of performance is required. The second set of comparators, indicated by the symbol "−?" determine whether a reduction of performance is required. Requests for an improval are accumulated by accumulator Σ1 and requests for a reduction are accumulated by accumulator Σ2. The aggregated change of requirements is determined by decision unit "ΔΔ". Depending on requests for improval and requests for reduction required, the decision unit generates an output signal ΔRA indicative either for a request for improval (PerformanceUp), or for a request for reduction (PerformanceDown)"

Figure 2C:
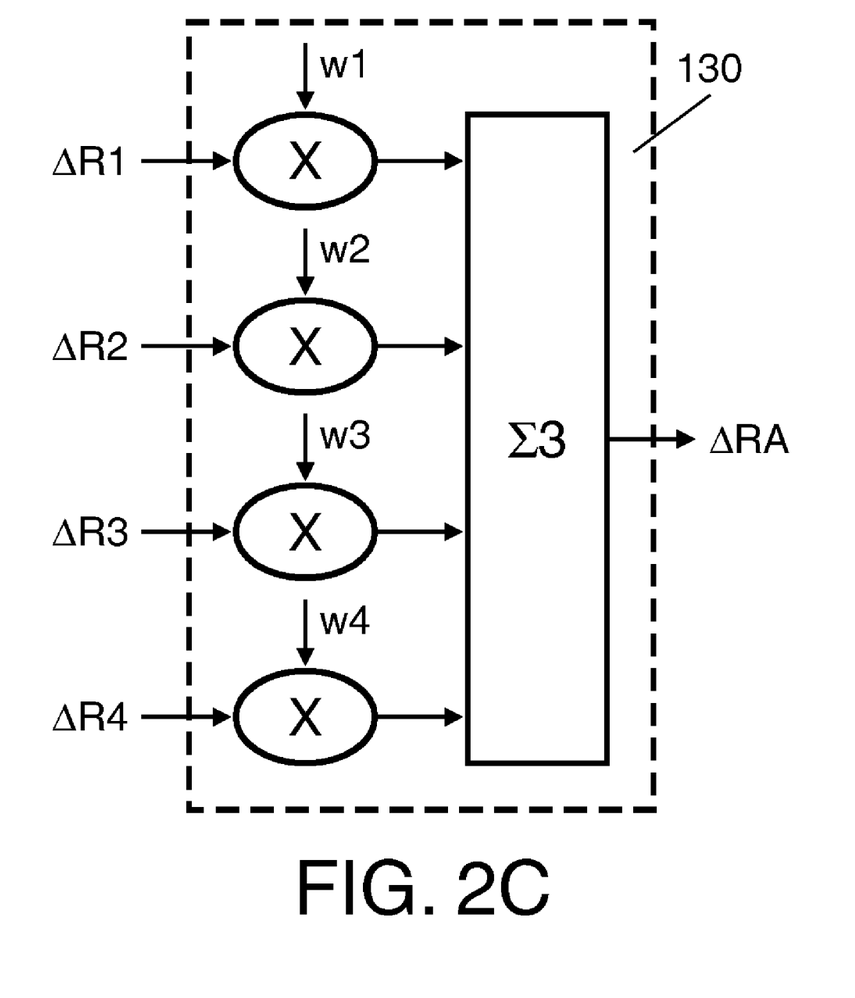

FIG. 2C shows a third example of the aggregation facility 130. Here it is presumed that the difference signals ΔR1, ΔR2, ΔR3 and ΔR4 are multilevel signals. The difference signals are weighted by weight factors w1, w2, w3, w4 and accumulated by accumulator Σ3 to determine the aggregated difference control signal ΔRA.

Figure 3:
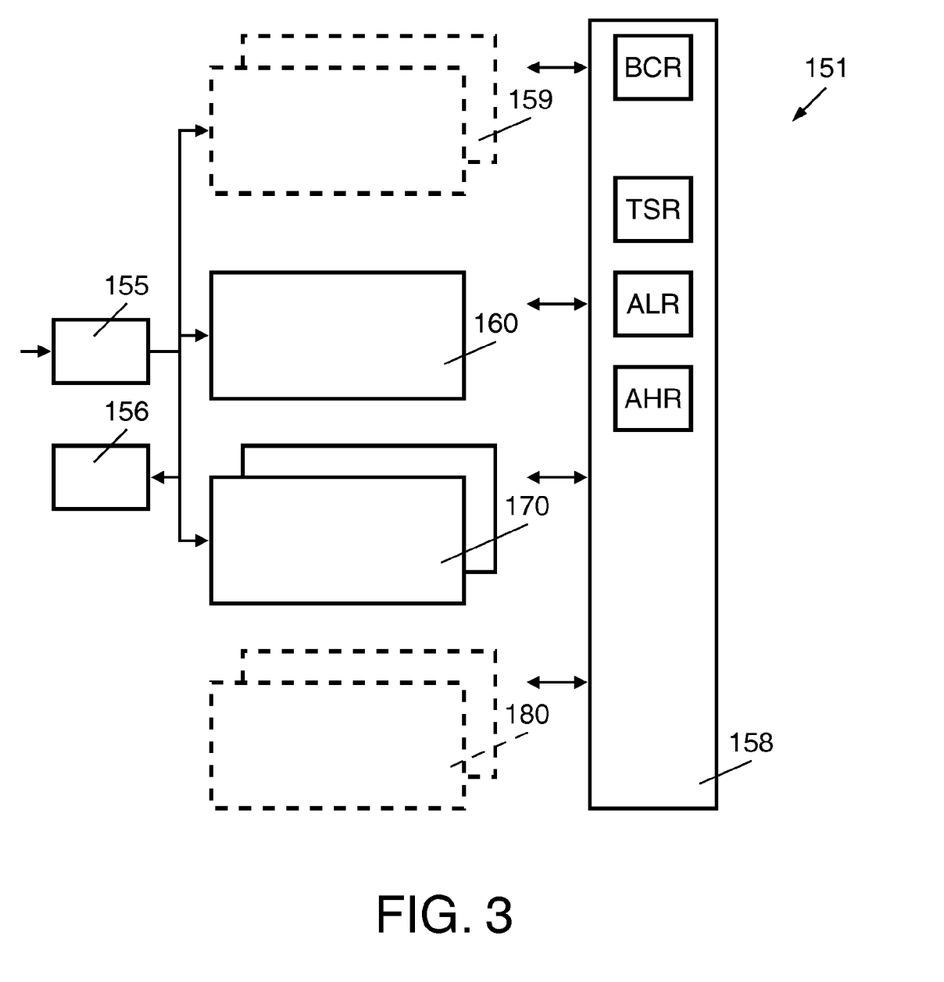
FIG. 3 shows an schematic drawing of a monitor in said second embodiment.

FIG. 3 schematically shows an embodiment for a monitor 151. The monitor samples transactions occurring on data handling device during a monitoring time-frame. By way of example it is assumed that the data handling device is a shared memory coupled to an AXI-bus. Other types of bus protocols, e.g. OCP are applicable as well. The monitor comprises a sample register 155 that samples data traffic between the relevant processing device, here 111 and the shared data-handling device 120. A transaction count register 156 is coupled to the sample register 155 for counting a number of transactions detected by the monitor since the start of the monitoring time-frame. A Time Stamp Register (TSR) 157 counts the number of clocks since the last enable event. The TSR value can be used to calculate bandwidth and latency. The monitor 151 has a block of memory mapped registers 158 for controlling the function of the monitor and for checking a status. The monitor 151 has the following main functional units that will be described in more detail in the sequel:

A bandwidth logic unit 160

Figure 7:
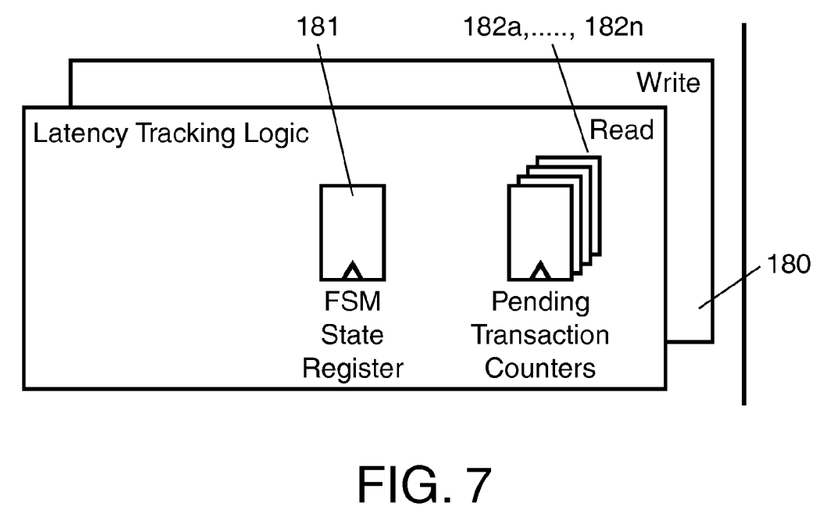
FIG. 7 shows a part of a monitor applicable in the third embodiment.

A latency logic unit 170,

Optionally the monitor has a debug unit 159, not further described in detail and a latency tracking logic unit 180, which is described with reference to a preferred embodiment shown in FIG. 7.

By way of example the block of memory mapped registers 158 comprise the following registers: The indication between brackets (R), (W) or (R/W) indicates whether the register is readable, writable or both.

| General Registers | | |
|---|---|---|
| ALR | (R/W) | Address Low Register. Control Register for floor of slave address range to be monitored. |
| AHR | (R/W) | Address High Register. Control Register for ceiling of slave address |

-continued

| | | |
|---|---|---|
| | | range to be monitored. |
| | | Bandwidth Registers |
| BCR | (R/W) | Bandwidth Control Register. By way example the content written in the bandwidth control register may specify whether a particular device is to be monitored, and whether all types of transactions are monitored or only transactions of a type read or write. |
| TSR | (R) | Timestamp Register. Contains the total number of AXI clock cycles in the current or most recent monitoring time-frame. |
| CBR | (R) | Cumulative Bandwidth Register. The total number of data elements (words) transferred which meet the criteria defined by the BCR. The average bandwidth can be calculated by dividing CBR by TSR. |
| | | Latency Registers (Read-specific) |
| RLCR | (R/W) | Read Latency Control Register. By writing to this register an ID of a particular device may be specified for which latency is to be measured. Also it may be specified what definition of latency is selected, e.g. a the duration until execution of a read command is started or the duration until the execution is finished. |
| RLTR | (R/W) | Read Latency Threshold Register. If any read latency sample is greater than this value, an interrupt is set. |
| RTCR | (R) | Read Transaction Count Register. Contains the total number of read transactions during the current or previous monitoring time-frame. |
| RCLR | (R) | Read Cumulative Latency Register. The sum of all the read latency samples measured. Average read latency can be calculated by dividing RCLR by RTCR |
| RMLR | (R) | Read Maximum Latency Register. The maximum value of all read latency samples. |
| RLSR | (R) | Read Latency Status Register. State register for read latency tracking state machine. Indicates if monitor is in normal mode or in the process of switching to track a new read ID. The following definition may be used: 00: (OFF) Idle state 01: (OFF2ON) Synchronize to New Data 11: (ON) Normal mode 10: (ON2OFF) Flush old data |
| RPTRn | (R) | Read Pending Transaction Register. Current number of pending transactions relative to a read ID. Variable n is based on the ID width. |
| | | Latency Registers (write-specific) |
| WLCR | (R/W) | Write Latency Control Register. By writing to this register an ID of a particular device may be specified for which latency is to be measured. Also it may be specified what definition of latency is selected, e.g. a the duration until execution of a write command is started or the duration until the execution is finished. |
| WLTR | (R/W) | Write Latency Threshold Register. If any write latency sample is greater than this value, an interrupt is set. |
| WTCR | (R) | Write Transaction Count Register. Contains the total number of write transactions during the current or previous sample. |
| WCLR | (R) | Write Cumulative Latency Register. The sum of all the write latency samples measured. Average write latency can be calculated by dividing RCLR by RTCR. |
| WMLR | (R) | Write Maximum Latency Register. The maximum value of all write latency samples. |
| WLSR | (R) | Write Latency Status Register. State register for write latency tracking state machine. Indicates if monitor is in normal mode or in the process of switching to track a new write ID. The following definition may be used: 00: (OFF) Idle state 01: (OFF2ON) Synchronize to New Data 11: (ON) Normal mode 10: (ON2OFF) Flush old data |
| WPTRn | (R) | Write Pending Transaction Register. Current number of pending transactions relative to a write ID. Variable n is based on the ID width. |

The block of registers 158 may comprise additional registers to specify conditions for which the monitoring device is to be triggered or conditions where the monitoring device shall give an interrupt to another device, e.g. if it monitors that a maximum latency is exceeded.

Figure 4:
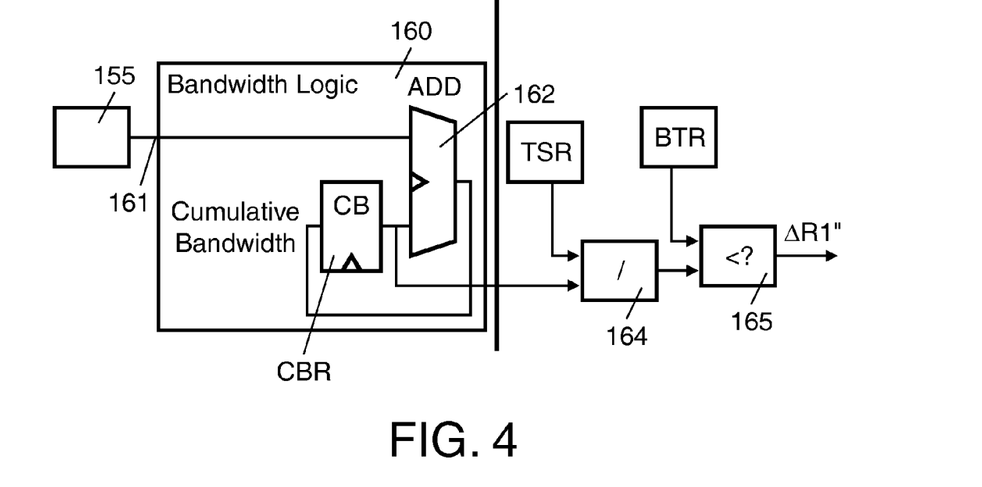
FIG. 4 shows a first part of the monitor of FIG. 3 in more detail.

A more detailed description for bandwidth logic unit 160 is given with reference to FIG. 4. The bandwidth logic unit 160 comprises an input 161 coupled to sample register 155. Each unit of data in a monitored transaction during a monitoring time-frame is counted by accumulator 162. The accumulated count is stored in cumulative bandwidth register CBR. Not each transaction needs to be monitored. A selection of transactions to be monitored may be made on the basis of the direction (read/write transaction), address range as specified in a low ALR and a high address register AHR, or another identification of a destination. The selection may be controlled by writing a command to register BCR in the block of memory mapped registers 158 or otherwise. The time lapsed since the start of the monitoring time-frame is stored in a second register TSR in said block of registers. A divider 164 calculates the average bandwidth as the content C(CBR) of register CBR and the content C(TSR) of register TSR. Comparator 165 performs a comparison of the calculated average bandwidth with a minimal required value for the bandwidth stored in a register BTR and generates a signal $\Delta R1''$ indicative for the difference between the performance available to and the performance R1 required by the processing device for which the monitor is operative.

Alternatively, a software application may read the content C(CBR) of register CBR and the content C(TSR) of register TSR, obtain a value for the average bandwidth BW available to the device for which the transactions are monitored and subsequently generate a signal $\Delta R1''$. This embodiment is described in more detail with reference to FIG. 6.

Figure 5:
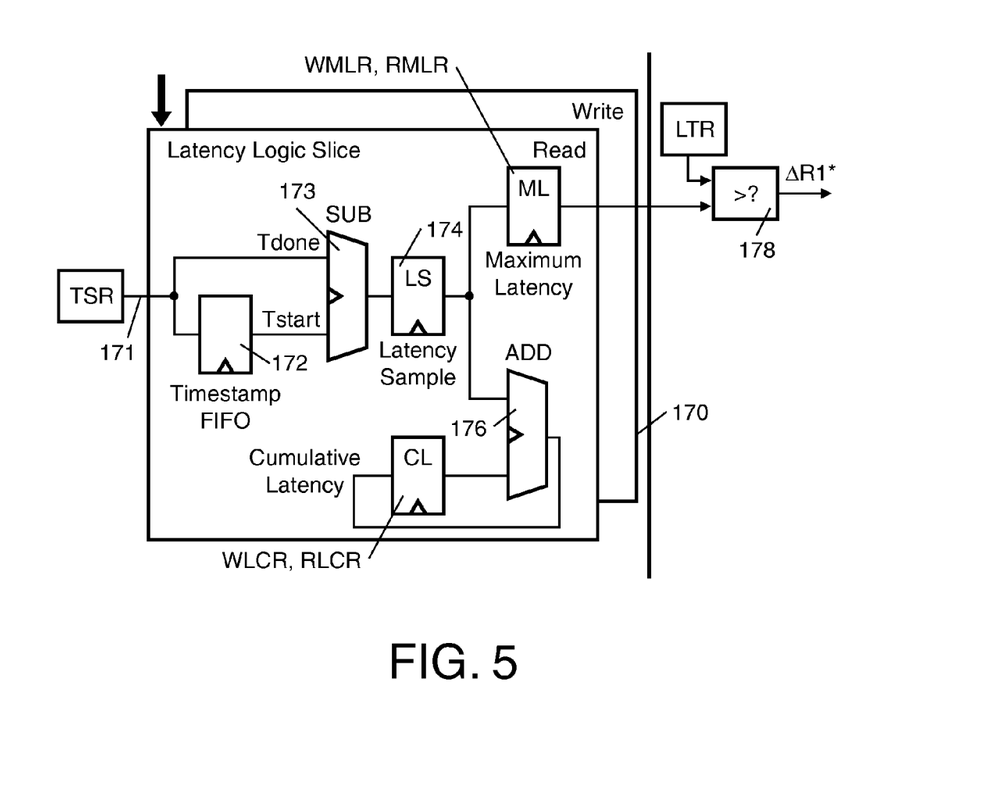
FIG. 5 shows a second part of the monitor of FIG. 3 in more detail.

FIG. 5 shows the latency logic unit 170 in more detail. The latency logic unit 170 comprises an input 171 coupled to the time-stamp register TSR. At each monitored write- or read command the value of the time-stamp register TSR is stored in a FIFO 172. A second value of the time-stamp register TSR sampled at the time the response to this command is obtained is compared by subtractor 173 and the difference is stored in latency sample register 174. For example in the AXI protocol the first time-stamp is taken at the moment the A(W/R) VALID signal is issued, and the second time-stamp is taken when the signal WREADY or RREADY is issued for a write and a read command respectively. Alternatively the second time stamp may be taken at the issue of the signal WLAST or RLAST respectively.

A maximum latency register WMLR, RLMR stores the maximum value of the latency observed by the monitor since the start of the monitoring time-frame. Additionally the observed values for the latencies are accumulated by accumulator 176 and stored in cumulative latency register WLCR, RLCR. In an embodiment the monitor may have a latency logic unit for observing latencies for write commands only, for read commands only, or for both. In the embodiment shown the latency logic unit 170 has latency threshold register LTR, that comprises a value indicated for the maximum allowable latency. A comparator 178 compares the value for the maximum latency stored in the maximum latency register WMLR, RMLR with the maximum allowable latency and provides a signal $\Delta R1^*$ indicative for the difference between the performance available to and the performance R1 required by their processing device for which the monitor is operative.

Alternatively, a software application may read the content C(WLCR) or C(RLCR) of register WLCR or register RLCR and the content C(LTR) of register LTR, and subsequently generate a signal $\Delta R1^*$.

Depending on how the difference is represented in the signal, the output signal $\Delta R1$ provided to the aggregation unit may be calculated in different ways, analogous to the way the signals $\Delta R1, \Delta R2, \Delta R3$ . . . are aggregated by the aggregation facility.

Figure 6:
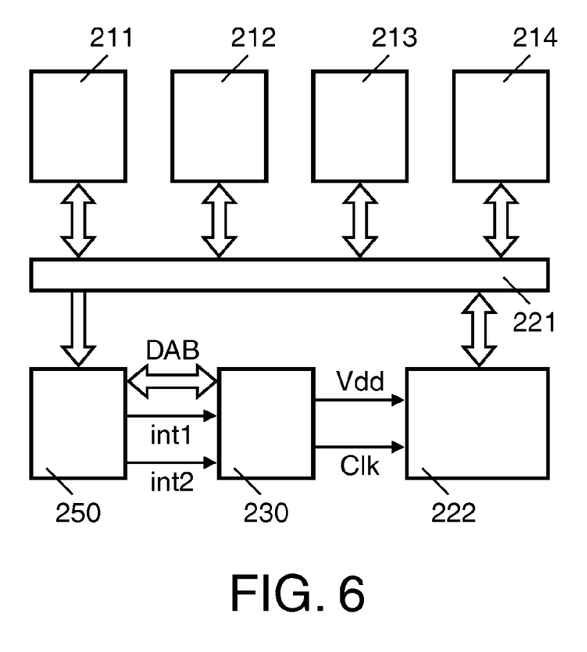
FIG. 6 shows a third embodiment of a data processing system according to the invention.

It is not necessary that each data-processing device has its own monitor. For example FIG. 6 shows a third embodiment of a data-processing facility according to the invention, wherein a plurality of data-processing devices use a single monitor 250 on a time-shared basis. Parts therein corresponding to those in FIG. 1 have a reference number that is 200 higher. In the embodiment shown the shared facility is a memory 222, coupled to each of the processing devices 211-214 by a bus 221. In this embodiment the monitor 250 tracks parameters of transactions for a particular device selected by the general purpose processor 230 and specified by its ID in the bandwidth control register BCR and/or a latency control register WLCR, LRCR. In the AXI transaction protocol transactions comprise such a device identification. Alternatively other transaction protocols may be used that comprise such an identification of the devices involved in the transactions.

The general purpose processor 230 specifies for which of the processors 211, 212, 213, 214 the performance of the shared data handling device is to be monitored by means of commands via a data and address bus DAB. The general purpose processor 230 can control the monitor 250 by writing memory mapped registers (as shown in the table above) via this bus. Additionally, the general purpose processor 250 can read status and measurement data from these registers via this bus. Additionally, the monitor 250 may provide interrupt signals int1, int2 to the general purpose processor 230, for example if a maximum latency is exceeded. In this way the general purpose processor 230 uses the monitor 250 to determine the individual requirements of the processors 211, 212, 213, 214. After aggregation of the requirements, the general purpose processor 230 controls the performance level of the shared data handling facility 222 by applying an appropriate supply voltage Vdd and a clock signal Clk to the shared data handling facility 222. In an embodiment the monitor has at least one latency tracking logic block 180 as shown in FIG. 7 with a state machine 181 (illustrated in FIG. 8) and a plurality of pending transaction counters $182a, \ldots 182n$ corresponding to each possible ID.

The current depth of the FIFO 172 in the Latency Logic Slice 170 indicates the number of pending transactions relative to the ID being monitored. The data in this FIFO 172 are the start times of all the pending transactions. The latency tracking logic block 180 enables a change of observed ID as follows.

The pending transaction counters $182a, \ldots 182n$ track the number of outstanding transactions for each non-monitored ID. The ID that is currently being monitored is effectively being stored in the FIFO 172 as the FIFO depth. Each counter $182j$ is wide enough to account for the maximum number of outstanding transactions, specified by the user. These counters need not be very wide, typically. The number of counters $182a, \ldots 182n$ is determined by the number of IDs possible. The "ID Width" parameter indicates the maximum number of IDs possible. In most cases,
monitors residing near an AXI master will not require a very large ID field. If the general purpose processing unit 230 selects a next processing device, it writes its ID in the write latency control register WLCR or the read latency control register RLCR, depending on whether a read or write latency is to be monitored.

Figure 8:
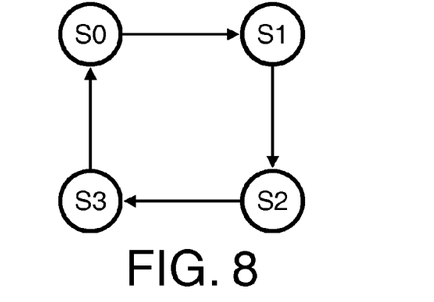
FIG. 8 shows the states of a state machine used in the part of FIG. 7.

The latency state machine 181 then handles the crossover from the old ID to the new ID. The state machine enters the "on to off" state (S1). In this state S1 FIFO data is popped each time a transaction for the old ID is completed until the FIFO depth reaches 0. During this state, the FIFO no longer accepts new point in time indications for data handling requests. However it increments the counter that corresponds to the old ID upon each request for data handling by the device with the old ID, namely when AVALID and AREADY are active for said ID. Once FIFO depth equals zero, the old ID counter will decrement based on RVALID and RREADY or WVALID and WREADY, depending on whether latency for read transactions or write transactions are monitored.

Once the FIFO depth equals zero, the state machine will move to the "off" or "program" state S2. In this state, the FIFO 172 is empty and the counters are tracking all activity based on the AXI traffic. The general purpose processor 230 monitors the latency status register WLSR or LRSR to know when to program the monitor. During this state S2, the ID field in the latency control registers can be programmed to the new ID value. In addition, the ENABLE bit in the latency control register can be set active.

Now, the state machine will enter the "off to on" or "re-sync" state S3. The counter corresponding to the new ID may have a value indicating the current number of transactions pending with respect to that particular ID. However, the monitor has no start information for these outstanding transactions, so that it is necessary to wait until "fresh data" is available. Accordingly, in state S3 the counter for the new ID is decremented stepwise to 0 upon each active signal ADONE, where ADONE is defined as RVALID and RREADY or WVALID and WREADY. Once the counter reaches 0, the state machine transfers to "normal" or "on" state S0. Also during this state, any new command start data timestamps are stored in the FIFO, but once the counter reaches 0, the monitor pops the FIFO on ADONE.

The states are preferably Gray coded, to simplify the synchronization of the values to another clock domain.

By way of example, the operation of the monitor as shown in FIGS. 3, 4, 5 and 7, 8 is described in a data processing system where the shared data communication facility uses the AMBA-AXI protocol.

To measure bandwidth using the monitor 151, a user may select either read, write, or both as the transaction type to be monitored. In a practical embodiment the measurement activity is started and stopped via the command register BCR in the block of registers 158. During the monitoring time-frame, the single read and write operations, indicated by RVALID and RREADY or WVALID and WREADY, respectively, are counted based on the transaction type specified in the control register, BCR. For example, if a transaction type of "read only" is specified, write transactions are ignored by the monitor. When the monitoring time-frame is finished, software can access the counted number of read and/or write operations from register CBR and the total number of clock cycles from register TSR.

Figure 9:
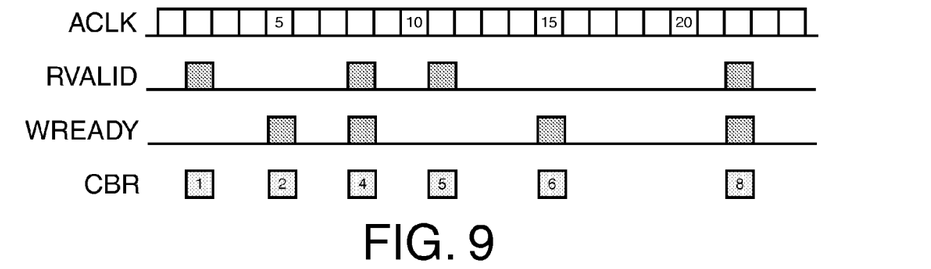
FIG. 9 shows the process of updating of the cumulative bandwidth register in an embodiment of the monitor as a function of signals observed by the monitor in a first example.

Given this information, bandwidth BW can be calculated as the quotient C(CBR)/C(TSR). In the example shown in FIG. 9, both read and write operations are tallied, accordingly, at each WREADY and RVALID the content of the register is increased by 1, resulting in a sum of eight. In this example, the total bandwidth determined in software would be 8/24 or 33%. In the figure, WREADY and RVALID are assumed active high.

If a specific downstream AXI slave is monitored, the ALR and AHR register must be programmed with the slave address range field and optionally, the Address ID should be programmed, for example with an (AWID/ARID) field in the control register BCR. The AWID/ARID field is useful when the monitored AXI master is capable of implementing virtual masters. The monitor will filter traffic according to the address range and the ID specified in the ALR, AHR and BCR. For read and write operations, the Read ID (RID) and Write ID (WID), respectively, travel with the ID of the current transaction. In the event that transactions for all slaves have to be monitored, the address range will encompass the complete slave address range. The monitor observes all transactions originating from the master it is attached to. If a transaction's address falls within the address range specified in the ALR and AHR, and the transaction ID is relevant, the event is flagged 'relevant' and used for obtaining the monitoring data. This flagging of transactions as relevant or not is done using a FIFO. The FIFO is required because a master is capable of issuing transactions to different slaves, but with the same command ID (AWID/ARID) and it is thus necessary to flag the relevant transactions intended for the slaves falling in the address range specified in the ALR and AHR. Since all transactions with a common ID have to be completed in the same order that they were issued, a FIFO is sufficient for keeping track. Since it is also possible for read and write transactions for a given ID to be interleaved, separate FIFOs are needed for both read and write for each unique command ID.

Figure 10:
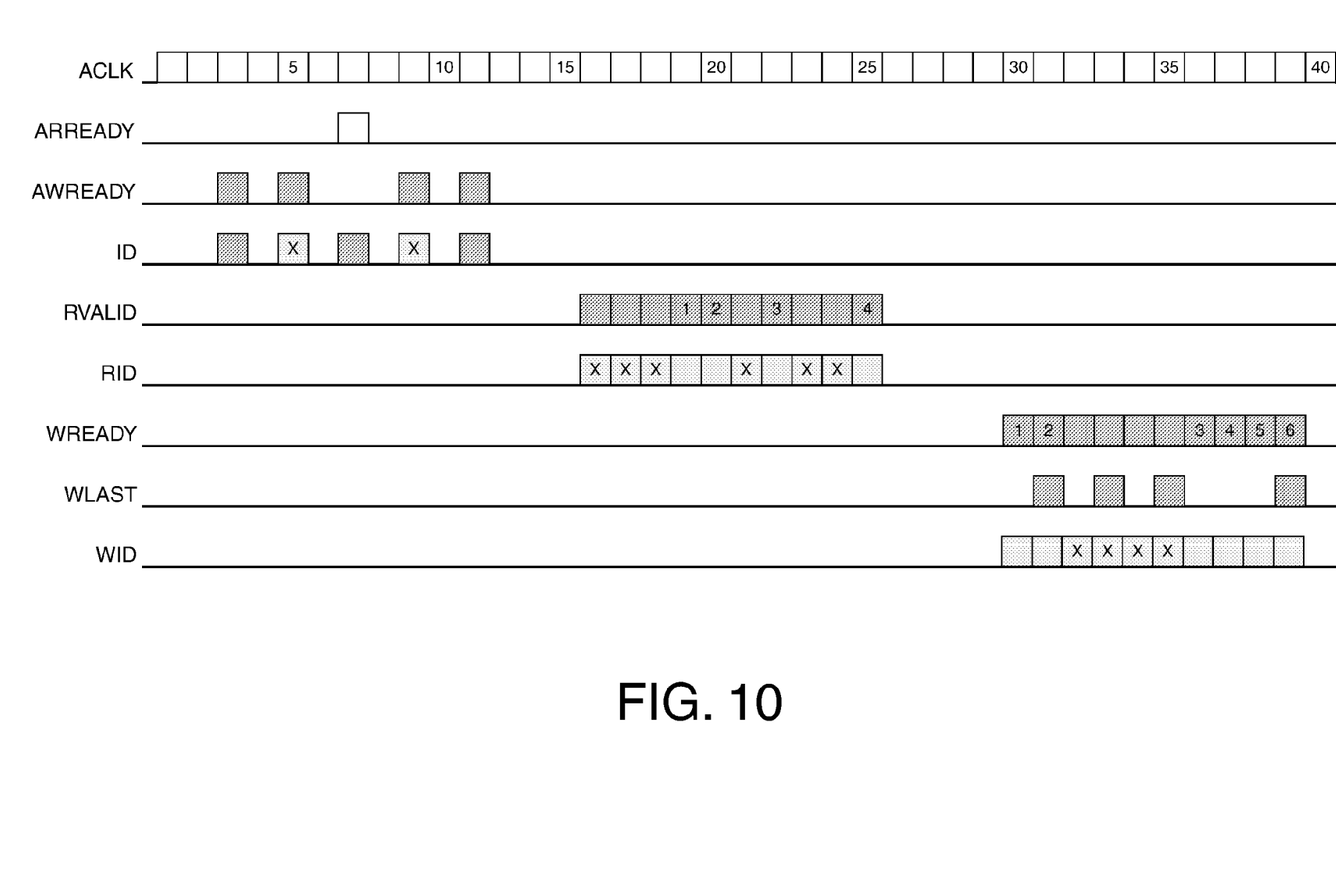
FIG. 10 shows the process of updating of the cumulative bandwidth register in an embodiment of the monitor as a function of signals observed by the monitor in a second example, FIGS. 11A, 11B respectively show the measurement of a write latency and of a read latency.

FIG. 10 shows the signals in a situation where a slave, say slave 115, is monitored by a virtual master, say Virtual Master 112, of Master 113, from FIG. 1. Operations intended for either a different slave (other than Slave 1), or originating from a different master (other than Virtual Master 2) are marked with an 'x'. For clarity, the 'transaction valid' FIFO activity discussed above is not shown. The read bandwidth in the case of monitoring for a particular address range can be obtained by observing the signals RVALID and RREADY qualified with the RID and the ID stored in the BCR register. In this example, over a period of 40 clock cycles, the read bandwidth is 4/40, or 10%. Write bandwidth is obtained by observing the signals WVALID and WREADY qualified with WID. For this case, the write bandwidth is 6/40 or 15%. The bandwidth for both read and write transactions would be (4+6)/40, or 25%. In the figure, the signals RREADY and WVALID are assumed active high for read and write commands respectively.

Figure 11A:
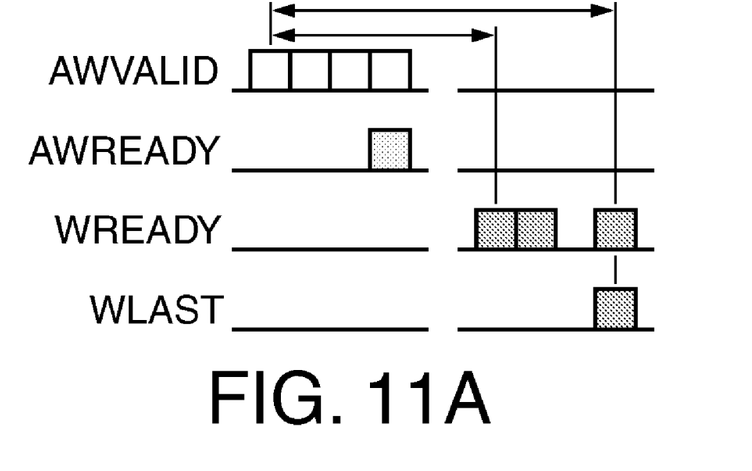

FIG. 11A shows a first and a second way to measure write latencies in a transaction based on the AXI protocol.
1. The latency between the start of the Write command, indicated by AWVALID and the moment that first write data is accepted (WREADY & WVALID).
2. The latency between the start of the Write command and the moment that the data is written, as indicated by WLAST & WREADY & WVALID.

Figure 11B:
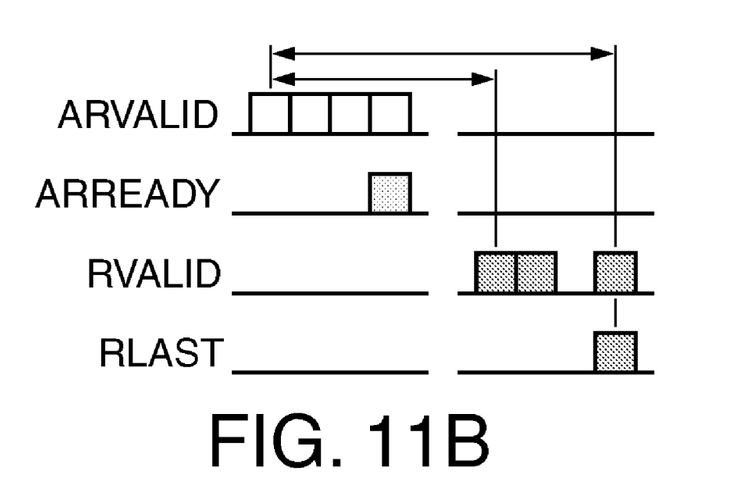

Likewise, as shown in FIG. 11B read latencies in a transaction based on the AXI protocol can be measured in a first and a second way.
1. The latency between the start of the Read command, indicated by ARVALID, and the moment that first read data becomes available (RVALID & RREADY).
2. The latency between the start of the Read command and the moment that the last read data has become available, as indicated by RLAST & RVALID & RREADY.

To measure latency in the AXI monitor, a user may select an appropriate one of the above-mentioned ways to measure the latency. The monitoring time-frame wherein the latency is measured may be determined by programming the control register. During the sample time, the latencies are calculated per transaction and a running sum is kept. Once the measurement is complete, the average latency is obtained as the quotient C(WCLR)/C(LTR), wherein C(WCLR) is the content of register WCLR, and C(LTR) is the content of register LTR, which calculation may be carried out in software or in hardware. Separate read and write FIFOs are used to support simultaneous read and write latency measurements in one AXI monitor. To accurately measure out of order transactions, the ID that matches the ID specified in the LCR has one FIFO to calculate the latency.

Figure 12:
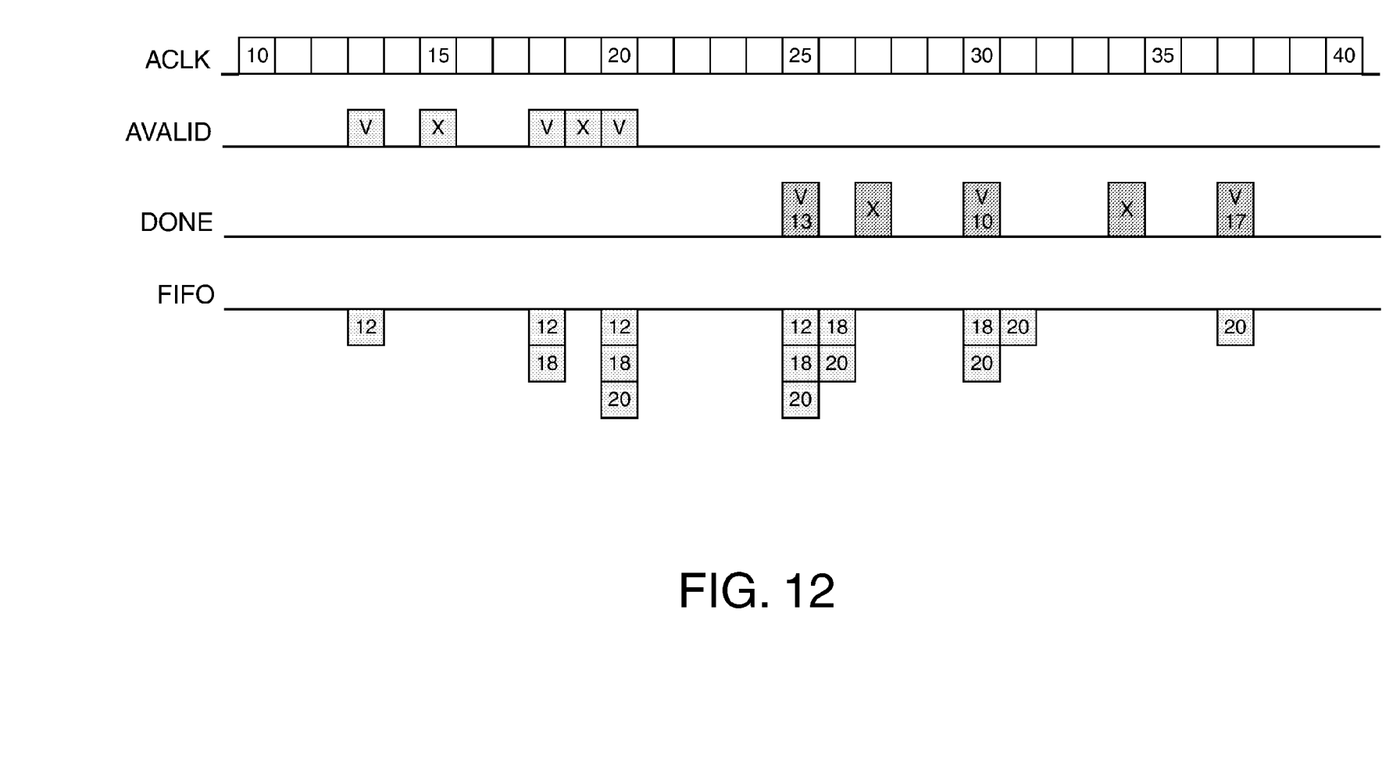
FIG. 12 shows the process of updating of the FIFO in an embodiment of the monitor as a function of signals observed by the monitor.

Latency is calculated for each master, and it is necessary that the AID field in the LCR Register be programmed accordingly. To obtain the peak or maximum latency, the register WMLR, RMLR can be polled. An example of measuring the latency for a specific processing device is shown in FIG. 12. The signals AVALID and DONE observed for IDs that do not match the ID specified in the control register are indicated by an 'x'. The IDs that match the ID specified in the control register are indicated by an 'V' (valid ID). FIFO shows the content of the FIFO 172. At the start of each matched command, the current timestamp is pushed into the FIFO. When the read or write activity is completed or retired (see "DONE"), the stored timestamp, indicating the start of the command issue, is subtracted from the current timestamp value. The result is the latency for the newly started or completed transaction. In this example, three latency samples of 13, 12 and 17 are summed by the monitor 151. The average latency, e.g. calculated by software, would be (13+12+17)/3, which amounts to 14. The peak latency, calculated in the AXI Monitor hardware, is 17.

While the invention has been illustrated and described in detail in the drawings and foregoing description, such illustration and description are to be considered illustrative and exemplary and not restrictive; the invention is not limited to the disclosed embodiments.

Other variations to the disclosed embodiments can be understood and effected by those skilled in the art in practicing the claimed invention, from a study of the drawings, the disclosure and the appended claims. In the claims the word "comprising" does not exclude other elements or steps, and the indefinite article "a" or "an" does not exclude a plurality. A single processor or other unit may fulfill the functions of several items recited in the claims. The mere fact that certain measures are recited in mutually different claims does not indicate that a combination of these measures cannot be used to advantage. Any reference signs in the claims should not be construed as limiting the scope.

The invention claimed is:

1. A data-processing system comprising:
   a plurality of data-processing devices;
   a data-handling facility shared by the data-processing devices;
   an aggregation facility for receiving signals indicative for individual requirements from the data-processing devices for a performance of the shared data-handling facility and for providing a control signal indicative for a required activity level to meet the aggregated requirements;
   a control device for controlling an activity level of the data-handling facility depending on the control signal; and
   a latency logic unit with a time-stamp unit for providing a point in time indication, a FIFO-memory having an input coupled to said time-stamp unit for storing a point in time indication of a data handling request from a monitored data processing facility, and a subtractor coupled to the time-stamp unit and an output of the FIFO-memory to subtract a point in time indication of a data handling request from a point in time indication of an execution of the request by the shared data handling facility.

2. A data-processing facility according to claim 1, wherein the data-handling facility comprises a data-storage facility.

3. A data-processing facility according to claim 1, wherein the data-handling facility comprises a data-communication facility.

4. A data-processing facility according to claim 1, further comprising at least one monitor for monitoring an available performance of the data-handling facility towards at least one data-processing device and for comparing the available performance with a required performance, and wherein a difference between the available performance and the required performance is used to control the activity level of the data-handling facility.

5. A data processing facility, according to claim 1, wherein said minimum required performance is a minimum bandwidth.

6. A data processing facility, according to claim 1, wherein said required performance is a maximum latency.

7. A data processing facility according to claim 1, further comprising at least one monitor for monitoring an available performance of the data-handling facility towards at least one data-processing device, the monitor comprising hardware facilities for recording at least one parameter selected from a maximum latency, a total latency, a total number of data units handled, and a general processing unit for reading said at least one parameter and calculating an aggregated performance from the at least one selected parameter.

8. A data processing facility according to claim 1, further comprising a latency tracking logic unit with a state machine and a plurality of counters, wherein the latency logic unit monitors a latency parameter for a selected processing device, and the counters count a number of data transactions for data processing devices not being monitored, wherein the state machine upon a request for monitoring for a different processing device prevents the FIFO-memory from accepting further input from the time-stamp unit and flushes the FIFO-memory step-wise upon execution of each request for which the point in time indication was stored in the FIFO-memory and wherein the state machine allows the FIFO-memory to accept point in time indications for the different processing device after the FIFO-memory is flushed.

9. A data processing facility according to claim 1, further comprising a bandwidth logic unit comprising an accumulator for counting each unit of data in a monitored transaction during a monitoring time-frame to obtain an accumulated count and a cumulative bandwidth register (CBR) for storing the accumulated count.

10. A data-processing method comprising the steps of
    receiving requirements from a plurality of master data-processing devices for a required performance of a shared data-handling facility towards the data-processing devices,
    aggregating said requirements, and
    controlling an activity level of the shared data-handling facility depending on the aggregated usage requirements;
    from a latency logic unit with a time-stamp unit, providing a point in time indication, at a FIFO-memory having an input coupled to said time-stamp unit, storing a point in time indication of a data handling request from a monitored data processing facility, and at a subtractor coupled to the time-stamp unit and an output of the FIFO-memory, subtracting a point in time indication of a data handling request from a point in time indication of an execution of the request by the shared data handling facility.

* * * * *